Figure 1:
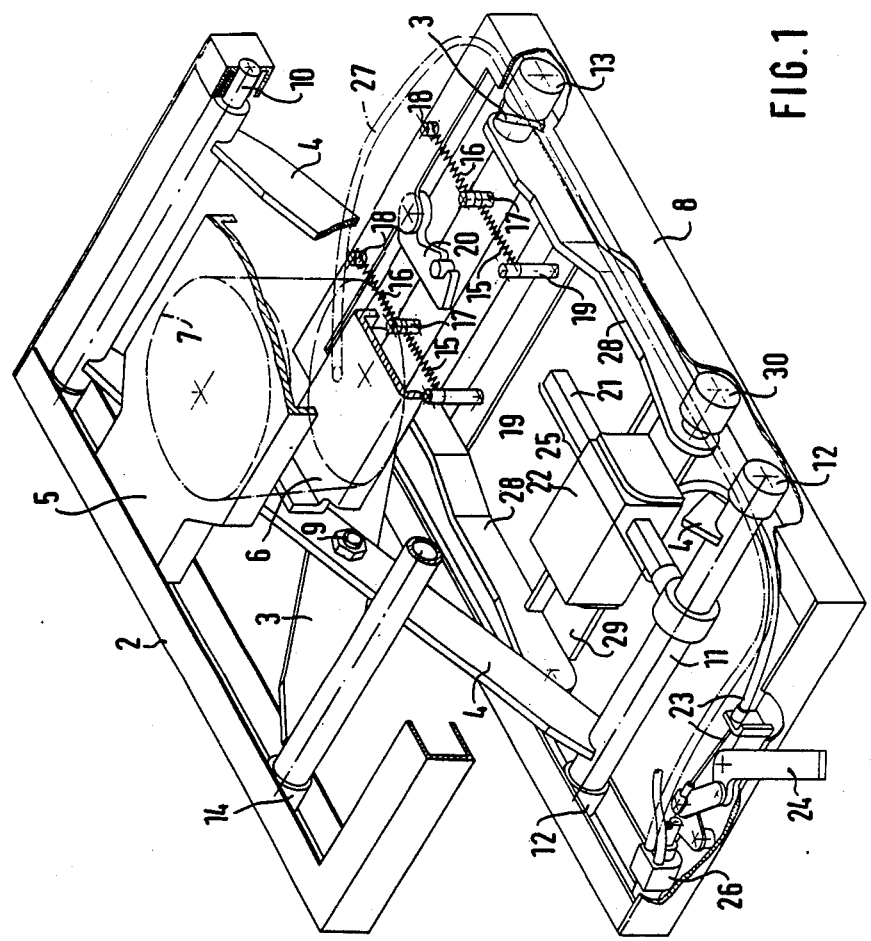

United States Patent [19]

Granzow et al.

[11] Patent Number: 4,941,641
[45] Date of Patent: Jul. 17, 1990

[54] VEHICLE SEAT

[75] Inventors: Manfred Granzow, Dorentrup; Hans-Peter Mischer, Bad Meinberg, both of Fed. Rep. of Germany

[73] Assignee: Gebr. Isringhausen, Bad Meinberg, Fed. Rep. of Germany

[21] Appl. No.: 306,027
[22] PCT Filed: May 19, 1988
[86] PCT No.: PCT/DE88/00292
§ 371 Date: Mar. 13, 1989
§ 102(e) Date: Mar. 13, 1989
[87] PCT Pub. No.: WO88/09270
PCT Pub. Date: Dec. 1, 1988

[30] Foreign Application Priority Data

May 22, 1987 [DE] Fed. Rep. of Germany ....... 3717703

[51] Int. Cl.$^5$ ............................................. F16M 13/00
[52] U.S. Cl. .................................... 248/588; 248/161; 248/421; 296/65.1
[58] Field of Search ............ 248/588, 592, 161, 406.2, 248/157, 419, 575, 421, 595, 411; 296/65.1

[56] References Cited

U.S. PATENT DOCUMENTS

| 4,148,518 | 4/1979 | Vilbeuf | 248/558 X |
| 4,384,701 | 5/1983 | Barley | 248/561 |
| 4,573,657 | 3/1986 | Sakamoto | 248/588 X |
| 4,589,620 | 5/1986 | Sakamoto | 248/588 X |
| 4,640,488 | 2/1987 | Sakamoto | 248/588 |
| 4,659,052 | 4/1987 | Nagata | 248/588 X |
| 4,729,539 | 3/1988 | Nagata | 248/588 X |

Primary Examiner—Ramon O. Ramirez
Attorney, Agent, or Firm—Salter & Michaelson

[57] ABSTRACT

An air-sprung vehicle seat includes an air spring and a scissors linkage which are operative for adjusting the vertical height of the seat. The vehicle seat also includes a locking device for adjustably fixing the vertical height of the seat, the locking device including a fixing element which is articulated to the scissors linkage and a fixing device which is engageable with the fixing element for fixing the relative position thereof in the seat. The seat also includes a non-return valve which is responsive to actuation of the fixing device for controlling the admission of compressed air into and the escape of compressed air from the air spring.

5 Claims, 1 Drawing Sheet

VEHICLE SEAT

DESCRIPTION:

The invention relates to an air-sprung vehicle seat having a seat frame which is supported, in such a manner that it is able to move vertically, on a base frame associated with the vehicle structure, by way of scissor members arranged on the seat frame and with the interposition of an air spring.

Vehicle seats of this type have the advantage that they can be adjusted to different static heights (that is the central position about which the seat moves with the weight of a driver=mid-ride position) merely by altering the internal pressure of the air spring (so-called integrated height adjustment).

In general, vehicle seats of this type are also required to have a locking device by means of which the vertical movement of the seat can be blocked, for example in case the vehicle seat moves too much on very bad roads or on rough terrain, or, for example, in case the airspring system becomes defective and the seat has a tendency to sink to its lower stops in a position near the floor in which the driver is no longer able to control the vehicle.

A known locking device for air-sprung vehicle seats comprises, for example, a catch hook which at a static height predetermined by the design catches a bolt secured to the scissor members or to the seat frame or base frame opposite it and thus locks the vertical movement of the seat (see, for example, DE-OS 35 34 378). Such catch hooks have the disadvantage, however, that they are only ever able to lock the seat when it is at a height predetermined by the design and therefore often force the driver to sit when actuating the locking device at a static height that is not at all the static height desirable for his body size that has been set by means of the integrated height adjustment.

The same disadvantage is encountered with another previously known locking device in which semimounted frames are used in combination with the removal of all the air from the air spring. The semimounted frames lie flat in the base frame of the seat during normal operation of the vehicle seat and assume an upright position only when a hand-operated lever that activates the locking device is acutated, with the result that the seat is able to sink onto the semimounted frames at the same time as all the air leaves the air spring. Of course, for that purpose the semimounted frames must be at a lower level or at any rate at the same level as the lowest static height to which the vehicle seat can be set using the integrated height adjustment, as otherwise it would not be possible for the seat to be locked at all, or to be placed on the semimounted frames, when set at a low static height when the vehicle is not in motion. It is also a fundamental disadvantage that with such a semimounted locking device the seat is not fixed, with the result that, for example in the case of driving on difficult terrain, seat and driver can be thrown upwards in spite of the supposed locking of the vertical movement of the seat, with the result that the driver may lose control of his vehicle.

The problem on which the invention is based is to provide a locking device for vehicle seats of the above type which ensures that the driver is able to fix the seat at any static height that he selects by means of the integrated height adjustment and effectively to lock all vertical movement upwards and downwards.

This problem is solved according to the invention as follows: the locking device has a fixing element that is articulated to the scissor members and is moved by the scissor members in accordance with the vertical movement of the seat, which fixing element can be fixed by way of a fixing device that acts on a fixing section of the fixing element, and the fixing section of the fixing element is the same size as or larger than the maximum vertical movement of the seat occuring at all height settings.

Such a fixing element may, in accordance with a preferred embodiment of the invention, be in the form of a rod that moves axially, the fixing device being designed as a clamping device that acts on the fixing section of the rod and that can effectively fix the rod in any position along the fixing section. For a precise description of the design of such a rod fixing element having a clamping/fixing device cf., for example, DE-OS 34 20 103.

It is, however, also possible to use other fixing elements and fixing devices for carrying out the teaching according to the invention, for example a strip of fabric or steel that is moved in accordance with the vertical movement of the seat and that can be fixed by means of the fixing device, or, for example, a toothed segment or the like that is rotated in accordance with the vertical movement of the seat, and that can be fixed by engagement with a toothed fixing device.

Since locking devices are often difficult to release or to unlock under load, a further problem of the invention is to avoid this disadvantage. This is achieved in the locking device according to the invention as follows: simultaneously with the actuation of the locking device an isolating valve which blocks both the supply of compressed air to and the release of compressed air from the air spring is operated. Therefore, in contrast to the previously known state of the art, the aim is not to release the air from the air spring but completely to close the air spring using the internal pressure that the air spring has when the seat is locked.

Two advantages are arrived at as a result of this. Firstly, the seat and the weight of the driver continue to be supported by the internal pressure of the air spring, with the result that with the air spring intact the locking device does not have to absorb any significant load and can be released again easily at any time. A further advantage of an air spring that is completely closed when the seat is locked is that even the seat user cannot inadvertently increase the load on the mechanical locking device by actuating the height adjustment, that is to say by supplying compressed air to the air spring.

If one considers the possibility that the air-spring system in a vehicle seat of the above-mentioned type might also become defective at some time, then the locking device according to the invention has the advantage that even without support from the air spring it is still possible for the driver to adjust the vehicle seat in principle to any static height he desires and thus to control the vehicle with the requisite degree of safety. This is also the case when there is a change of driver while the air-spring system is defective and the static height of the vehicle seat has to be readjusted in accordance with the change in the driver's body size.

The locking device according to the invention blocks the vertical movement of the seat. An additional provision in many vehicle seats is the mounting of the scissor members in such a manner that they are also movable horizontally in the base frame or in the seat frame, in order to protect the driver from horizontal jolting. An especially advantageous embodiment of the invention provides for such a case for the fixing element to be articulated to one of the scissor members or to one pair of scissor members and for the fixing device to be secured to the other scissor member or pair of scissor members.

This means that the locking device according to the invention is effective only between the scissor members and does not prevent possible horizontal movement of the scissor members relative to the base frame or to the seat frame. The optional mounting of the seat to allow horizontal movement can therefore also be retained when the vertical movement of the seat is blocked. An embodiment of the invention is described in detail below.

FIG. 1 is a perspective view of a vehicle seat according to the invention.

The basic structure of the movement system of a vehicle seat is shown. The upholstered parts, such as, for example, the upholstery of the seat, the back-rest, any arm-rests and so on, are not shown.

The movement system comprises the seat frame 2 which is supported, in such a manner that it is movable vertically, on a base frame 8 associated with the vehicle structure (not shown), by way of scissor members 3 and 4 arranged on the seat frame and with the interposition of the air spring 7 that is supported by the cross pieces 5 and 6.

The scissor members 3 and 4, which are articulated to one another at the cross-over point of the scissor members by the screw 9, are present in pairs in the movement system shown, but the pair that is at the front in the drawing is broken away to give a better view of the system.

The pair 4 of scissor members has a firm mounting in the seat frame 2, on the axle 10. In the lower base frame 8 the pair 4 of scissor members is mounted on rollers 12 by way of the axle 11, with the result that here there is a so-called movable mounting.

The pair 3 of scissor members is arranged in movable mountings both in the seat frame 2 and in the base frame 8. In this case the rollers 13 and 14 can be seen.

The movable mountings 12 and 13 in the based frame enable the scissor members to move horizontally as a whole in the base frame 8. Provided for this purpose are the pairs 15 and 16 of tension springs which are secured by the bolts 17 to the scissor members and by bolts 18 and 19 to the base frame. If these horizontal movements are to be blocked, the catch hook 20, which can be operated by means of, for example, a Bowden cable or a lever (not shown), is provided for this purpose.

The locking device according to the invention for blocking the vertical movement is in the form of a rod 21 lying in the base frame 8 and connected by way of the axle 11. This rod 21 is moved in an axial direction in accordance with the vertical movement of the movement system.

A clamping device 22 which can be activated by a Bowden cable 23 and the lever 24 and which is capable of fixing the rod 21 in any of its positions along the fixing section 25 fits over the rod 21.

When the lever 24 is actuated an isolating valve 26 is operated at the same time; when the locking device is locked, this isolating valve blocks both the supply of compressed air to and the release of compressed air from the air spring 7. For this purpose the air hose 27 for introducing air into and releasing air from the air spring is connected to the isolating valve 26.

In order to enable the blocking of the vertical movement of the movement system to be carried out independently of the horizontal movement that can be blocked by the catch hook 20, the vertical locking device according to the invention is effective only between the pairs 3 and 4 of scissor members. As can be seen from the drawing, links 28 mounted inside the base frame 8 on the rollers 30 and 13 are provided which connect the pairs 3 of scissor members to the cross piece 29 of the links 28. Secured to this cross piece 29 is the clamping device 22. If the clamping device 22 is activated by means of the lever 24 by way of the Bowden cable 23, the clamping device fixes the rod 21, preventing the vertical movement of the seat and the movements of the pairs 3 and 4 of scissor members.

It can be seen that because of the fixing section 25 of the rod 21, which section is of dimensions that accord with the teaching according to the invention, the locking device can become effective with the seat in any desired position, irrespective of the static height to which the seat has been adjusted by altering the internal pressure of the spring 7.

We claim:

1. In an air sprung vehicle seat comprising a base frame adapted to be mounted on a vehicle, a seat frame, scissors linkage means including first and second scissors members mounted on said base frame and operative for supporting said seat frame so that the vertical position thereof is adjustable relative to said base frame, air spring means adapted to be connected to a source of pressurized air and responsive to internal air pressure in said air spring means for adjusting the vertical position of said seat frame relative to said base frame, and locking mean actuatable for locking the vertical position of said seat frame relative to said base frame, the improvement comprising said locking means including a fixing element articulated to said scissors means and moving therewith during vertical movement of said seat frame relative to said base frame, said fixing element including a fixing section having a length which is at least as great as the length of the maximum vertical movement of said seat frame relative to said base frame, said locking means further including a fixing device for securing said fixing section in order to secure the relative position of said fixing element in said seat.

2. The vehicle seat of claim 1 further comprising isolation valve means for blocking the flow of compressed air to and from said air spring when said locking means is in an actuated condition.

3. In the vehicle seat of claims 1 or 2, said fixing element comprising an elongated rod, said fixing section comprising a portion of said elongated rod, said elongated rod being disposed adjacent either said base frame or said seat frame, said fixing device further characterized as a clamping device which is clampingly engageable with the fixing section portion of said elongated rod.

4. In the vehicle seat of claims 1 or 2, said scissors members being mounted so that they are each horizontally movable in either said base frame member or said seat frame member, said fixing element being articulated to one of said first and second scissors members, said fixing device being secured to the other one of said first and second scissors members.

5. In the vehicle seat of claim 3, said scissors members being mounted so that they are each horizontally movable in either said base frame member or said seat frame member, said fixing element being articulated to one of said first and second scissors members, said fixing device being secured to the other one of said first and second scissors members.

* * * * *